(12) United States Patent
Ramesh et al.

(10) Patent No.: US 10,142,256 B2
(45) Date of Patent: Nov. 27, 2018

(54) TIME AND FREQUENCY ALLOCATION FOR CONCURRENT COMMUNICATIONS ON A SHARED COAXIAL CABLE

(71) Applicant: Maxlinear, Inc., Carlsbad, CA (US)

(72) Inventors: Sridhar Ramesh, Irvine, CA (US); Curtis Ling, Carlsbad, CA (US); Timothy Gallagher, Encinitas, CA (US)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 15/205,962

(22) Filed: Jul. 8, 2016

(65) Prior Publication Data

US 2017/0012894 A1 Jan. 12, 2017

Related U.S. Application Data

(60) Provisional application No. 62/190,448, filed on Jul. 9, 2015.

(51) Int. Cl.
*H04L 12/911* (2013.01)
*H04W 52/36* (2009.01)

(52) U.S. Cl.
CPC ............ *H04L 47/72* (2013.01); *H04L 47/822* (2013.01); *H04W 52/367* (2013.01)

(58) Field of Classification Search
CPC ..... H04L 47/72; H04L 47/822; H04W 52/367
See application file for complete search history.

(56) References Cited

U.S. PATENT DOCUMENTS

| | | | | |
|---|---|---|---|---|
| 2003/0079234 A1* | 4/2003 | Rasmussen | .......... | H04N 5/4401 725/153 |
| 2005/0273218 A1* | 12/2005 | Breed | .................... | B60C 11/24 701/2 |
| 2008/0279204 A1* | 11/2008 | Pratt, Jr. | ................ | G01D 21/00 370/406 |
| 2009/0017801 A1* | 1/2009 | Laroia | ................. | H04W 76/021 455/414.1 |
| 2009/0252134 A1* | 10/2009 | Schlicht | ................ | H04L 1/0015 370/338 |
| 2009/0254794 A1* | 10/2009 | Malik | .................. | H04L 1/0041 714/776 |

(Continued)

*Primary Examiner* — Phong La
(74) *Attorney, Agent, or Firm* — McAndrews, Held & Malloy, Ltd.

(57) ABSTRACT

Circuitry for use in a network controller comprises a processor and memory. The network controller is operable to control communications in a network comprising a plurality of devices connected via a shared coaxial cable. The circuitry is operable to maintain one or more data structures that hold per-sender-receiver-pair link parameters and per-sender-receiver-pair bandwidth grant status. The circuitry is operable to, in response to receipt of a reservation request on the shared coaxial cable, decide which one or more of a plurality of subbands and which one or more of a plurality timeslots to reserve for the transmission based, at least in part, on the per-sender-receiver-pair link parameters and the per-sender-receiver-pair bandwidth grant status in the one or more data structures. The circuitry is operable to generate a reservation grant message that indicates the decided one or more subbands and the decided one or more timeslots.

14 Claims, 5 Drawing Sheets

(56) References Cited

U.S. PATENT DOCUMENTS

| | | | |
|---|---|---|---|
| 2010/0329247 A1* | 12/2010 | Kennedy | H04B 1/7163 370/389 |
| 2011/0039562 A1* | 2/2011 | Balasubramanian | H04W 36/0033 455/436 |
| 2014/0164641 A1* | 6/2014 | Ye | H04L 47/127 709/235 |
| 2014/0169298 A1* | 6/2014 | Li | H04W 72/12 370/329 |
| 2016/0036114 A1* | 2/2016 | Okada | H01P 5/107 307/104 |
| 2016/0248474 A1* | 8/2016 | Gilson | H04B 3/06 |
| 2017/0293752 A1* | 10/2017 | Patel | G06F 21/44 |

* cited by examiner

TIME AND FREQUENCY ALLOCATION FOR CONCURRENT COMMUNICATIONS ON A SHARED COAXIAL CABLE

PRIORITY CLAIM

This application claims priority to and the benefit of the following application(s), each of which is hereby incorporated herein by reference:

U.S. provisional patent application 62/190,448 titled "Time and Frequency Allocation for Concurrent Communications on a Shared Coaxial Cable" filed on Jul. 9, 2015.

BACKGROUND

Limitations and disadvantages of conventional approaches to time and frequency allocation for concurrent communications on a shared coaxial cable will become apparent to one of skill in the art, through comparison of such approaches with some aspects of the present method and system set forth in the remainder of this disclosure with reference to the drawings.

BRIEF SUMMARY

Methods and systems are provided for time and frequency allocation for concurrent communications on a shared coaxial cable, substantially as illustrated by and/or described in connection with at least one of the figures, as set forth more completely in the claims.

DETAILED DESCRIPTION

Figure 1:
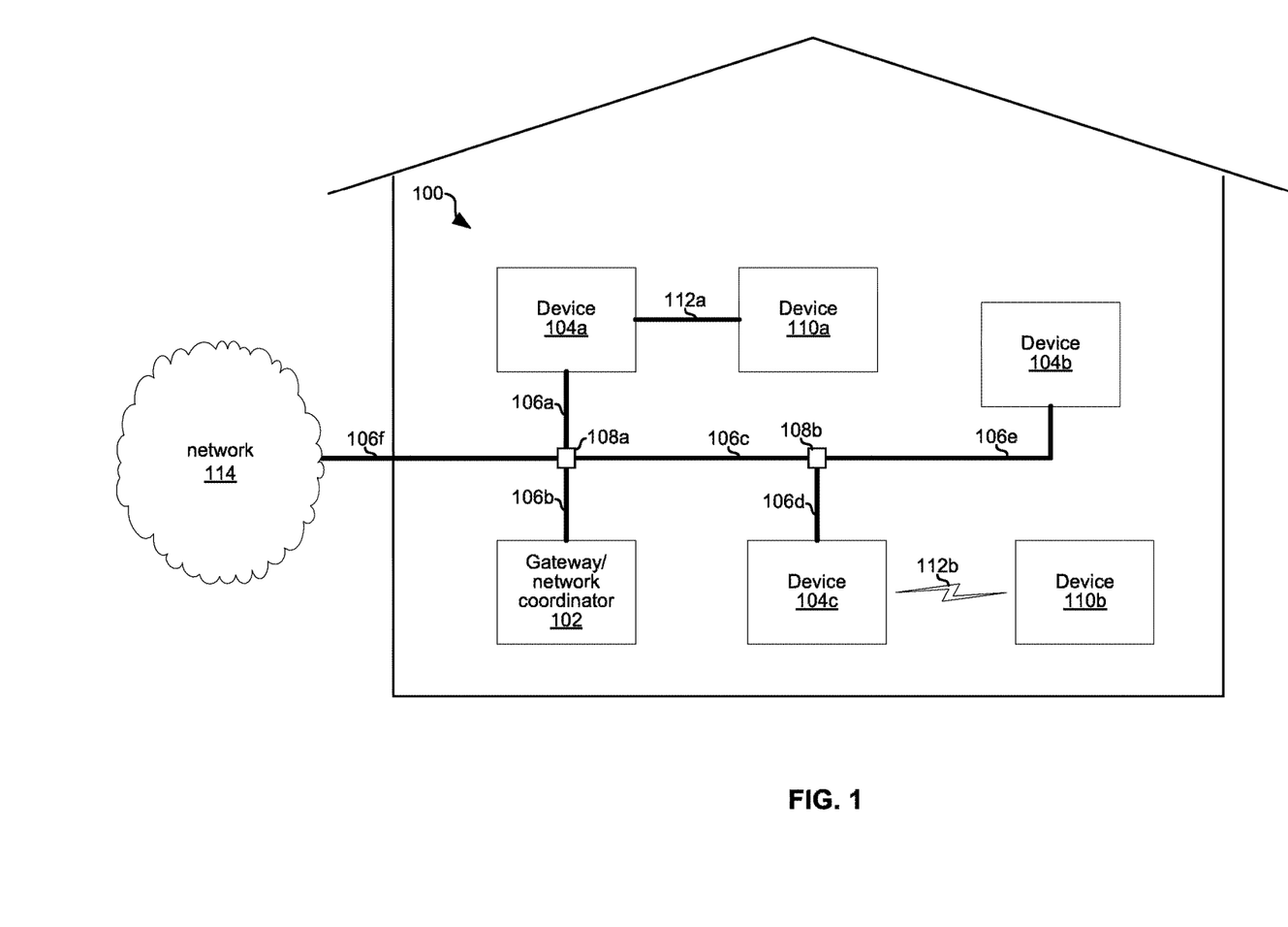
FIG. 1 depicts an example multimedia over coax alliance (MoCA) network adapted in accordance with aspects of this disclosure in order to permit concurrent communications among multiple pairs of nodes.

FIG. 1 depicts an exemplary MoCA network. Shown in FIG. 1 is a local area network (LAN) 100 connected to a network 114. The exemplary LAN 100 comprises a device 102 (e.g., a gateway device and/or network controller device, etc.) and network devices 104a-104c coupled via links 106a-106f and splitters 108a-108b. The LAN 100 also comprises devices 110a and 110b coupled to respective network devices 104a and 104c via links 112a and 112b, respectively.

Each of the links 106a-106f may, for example, comprise wired cabling, optical cabling, and/or wireless links. In an exemplary embodiment, each of the links 106a-106f comprises coaxial cabling. The splitter 108a is operable to electrically couple links 106a, 106b, 106c, and 106f such that the signal on each of these four links is substantially the same. The splitter 108b is operable to electrically couple links 106c, 106d, and 106e such that the signal on each of these three links is substantially the same.

The device 102 comprises circuitry operable to communicate over the links 106a-106f. The circuitry of the device 102 may also be operable to communicate with network 114 (e.g., a CaTV network, a DSL network, a satellite network, etc.). The device 102 may be, for example, a set-top box or gateway operable to receive data from the network 114 via the links 106f and 106b, process the received data, and convey the processed data to the devices 104a-104c via the links 106a-106e. In an exemplary embodiment, the device 102 may communicate the processed data over the links 106a-106e in accordance with multimedia over coaxial alliance (MoCA) standards, such as the "MoCA MAC/PHY Specification v2.0 MoCA-M/P-SPEC-V2.0-20100507," which is hereby incorporated herein by reference in its entirety. In such an embodiment, the device 102 may function as the network coordinator (NC) of the MoCA network.

Each of the example devices 104a-104c may comprise circuitry operable to communicate over the links 106a-106e. The device 104c may be, for example, a wireless access point operable to convert between the network protocols (e.g., MoCA, etc.) utilized on the links 106a-106e and the network protocols (e.g., IEEE 802.11, Bluetooth, etc.) utilized on the link 112b. The device 104a may be, for example, a network adaptor operable to convert between the network protocols (e.g., MoCA, etc.) utilized on the links 106a-106e and the network protocols (e.g., HDMI, USB, Ethernet, etc.) utilized on the link 112a.

The devices 110a and 110b may comprise circuitry operable to receive media and/or data via the links 112a and 112b, respectively. The devices 110a and 110b may comprise circuitry operable to transmit media and/or data via the links 112a and 112b, respectively. Each of the devices 110a and 110b may be, for example, an end-point such as a television or personal computer.

In operation, a device 104 (representing any of 104a, 104b, and 104c) desiring to transmit to another device 104 (representing any other of 104a, 104b, and 104c) sends a reservation request (or request to transmit) to the network controller 102. The network controller 102 then grants or denies the reservation request. If the reservation request is granted, the grant may include an assignment of both: one or more timeslots on which the transmission is to take place, and one or more frequency bands on which the transmission is to take place. Including a frequency assignment in the grant enables multiple pairs of MoCA nodes to communicate concurrently (or simultaneously) on different frequencies.

The determination of whether to grant the reservation request and, if so granted, the determination of which timeslot(s) and frequency(ies) to allocate for the grant, may be based on one or more factors including, for example: the identity of the device that would be transmitting, the identity(ies) of the intended destination device(s), link parameters that would be used for the transmission, identities of transmit and destination devices for other pending reservation requests, link parameters that would be used for the other pending reservation requests, identities of transmit and destination devices for previously granted reservation request (where transmissions are ongoing or scheduled for some time in the future), and/or link parameters used for the previously-granted reservation requests.

Figure 2:
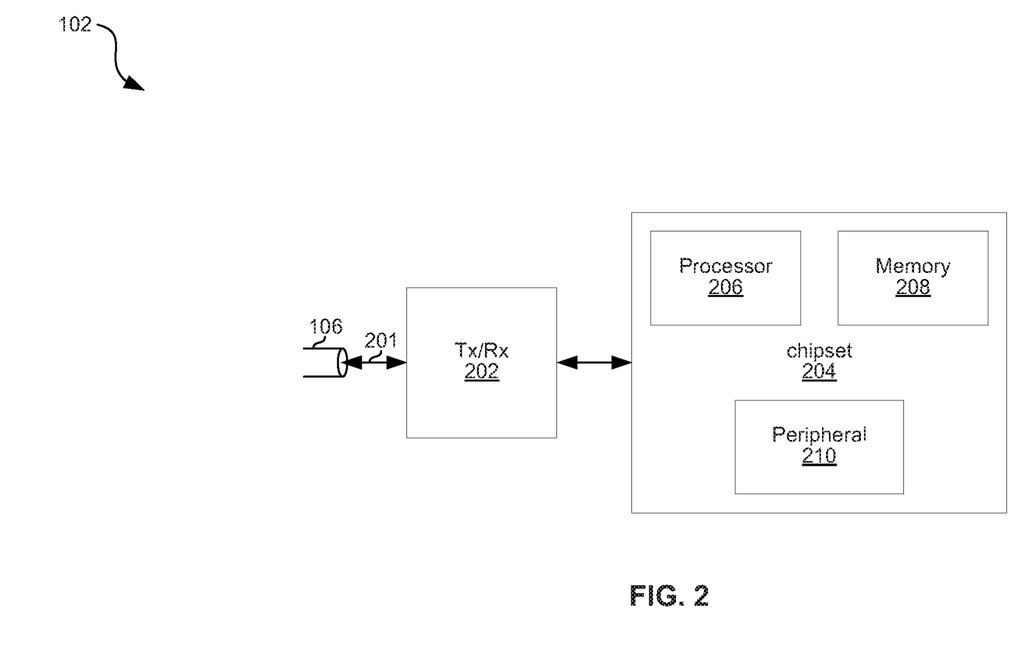
FIG. 2 is a block diagram of a MoCA network controller adapted to provide bandwidth grants on both a time and a frequency basis.

FIG. 2 is a block diagram of a MoCA network controller (NC) adapted to provide bandwidth grants on both a time and a frequency basis. The example network controller comprises a transceiver 202 and chipset 204.

The transceiver 202 is configured for transmitting and receiving over the cable 106 using both time and frequency division multiplexing. The transceiver 202 may be operable to measure signal quality metrics (e.g., signal-to-noise ratio, etc.) for the coaxial cable 106, and report the measured metrics to the chipset 204.

The chipset 204 comprises a processor (e.g., x86 based, ARM based, an FPGA, ASIC, etc.) 206, memory 208 (e.g., DRAM, nonvolatile storage, a non-transitory machine-readable storage medium, etc.), and peripheral circuitry 210 (e.g., bus adaptor(s), LAN adaptor(s), etc.).

The processor 206, using memory 208, operates to decide whether to grant or deny reservation requests received via transceiver 202, determine which timeslot(s) and frequency(ies) to allocate for granted reservation requests, and to provide grant or denial messages to the transceiver 202 for transmission onto the cable 106. This may comprise the processor 206 performing the process described below with reference to FIG. 4 using the data structures shown in FIG. 3.

Figure 3:
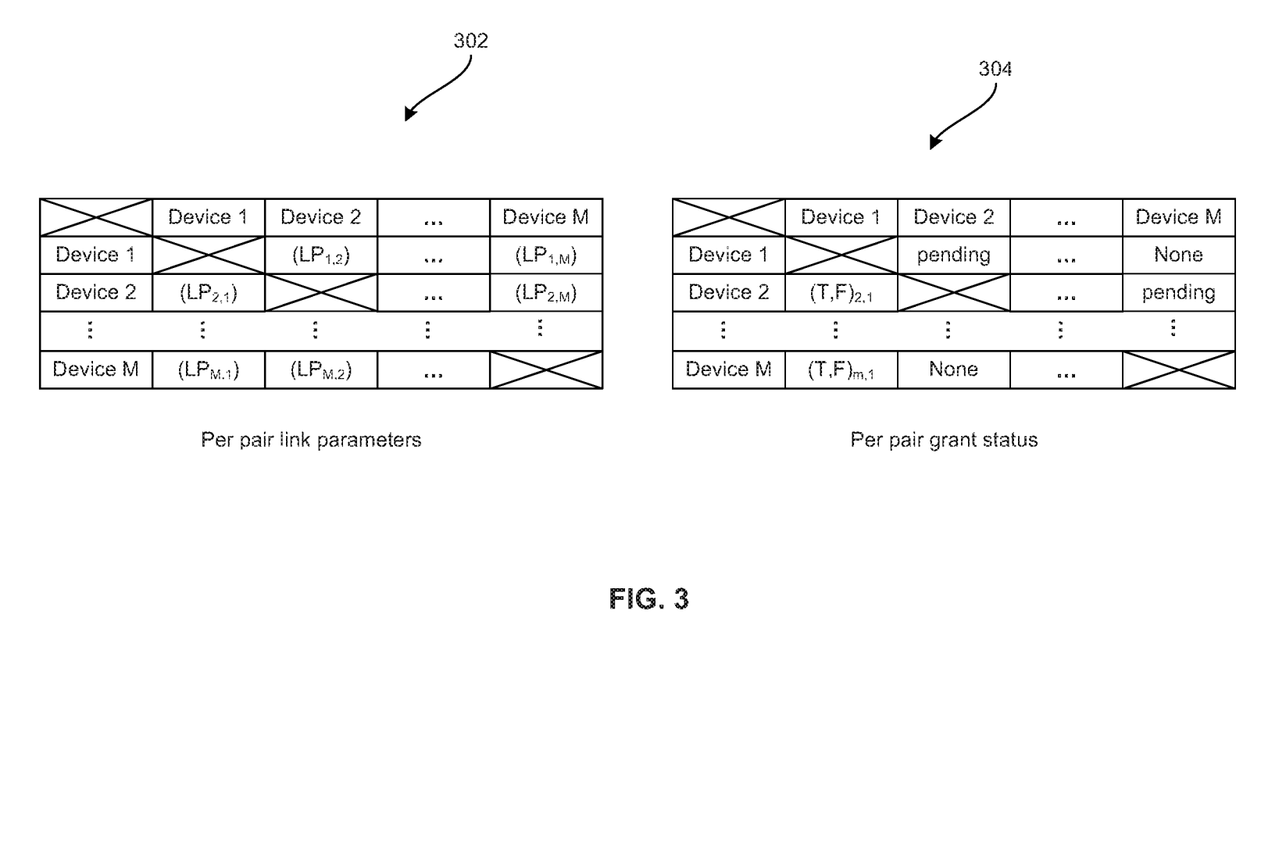
FIG. 3 depicts example data structures which the MoCA network controller of FIG. 2 may use for granting reservation requests.

FIG. 3 depicts example data structures which the MoCA network controller of FIG. 2 may use for granting reservation requests. Shown are a link parameters data structure 302 and a grant status data structure 304.

The data structure 302 (e.g., a lookup table stored in memory 208) stores sets of link parameters for each possible pair of M devices on the shared (shared among the MoCA network and one or more networks such as a CaTV network) communication medium 106 (e.g., in FIG. 1, M=4 and the four devices are 102, 104a, 104b, and 104c). Each set of link parameters ($LP_{x,y}$) may include, for example, a minimum transmit power needed for a transmission from device 'x' to reach device 'y' (i.e., the more attenuation between a transmitting device and a receiving device, the more transmit power that will be needed), and spectral characteristics of the link between the device 'x' and device 'y' (e.g., SNR over frequency (e.g., in list or table form for a plurality of frequencies), noise level, power spectral density (e.g., in list or table form for a plurality of frequencies), and/or other measurement(s) for each of a plurality of possible subbands). The per-pair link parameters may, for example, be determined through the use of probes communicated among each pair of devices on the network.

The data structure 304 (e.g., a lookup table stored in memory 208), stores status/characterizations of reservation requests. For each possible pair of M devices, the table 304 indicates whether a reservation request is pending or granted. Where no reservation request is pending or granted for transmissions from device 'x' to device 'y', the corresponding entry in table 304 indicates "none;" where a reservation request is pending for a transmission from device 'x' to device 'y', the corresponding entry in table indicates "pending;" and where a reservation request has been granted, the corresponding entry holds $(T,F)_{x,y}$, where 'T' is the timeslot(s) that has been allocated for the transmission (e.g., referenced to some determined network clock) and F is the subband(s) that have been allocated for the transmission.

Figure 4:
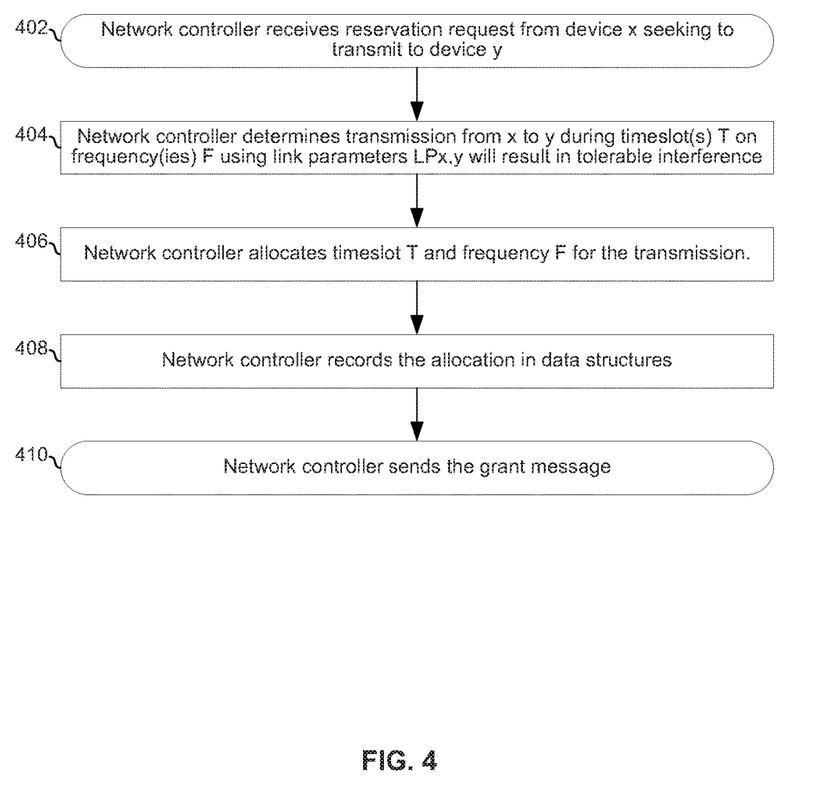
FIG. 4 is a flowchart illustrating an example request grant process performed by the MoCA network controller of FIG. 2.

FIG. 4 is a flowchart illustrating an example reservation request grant process performed by the MoCA network controller of FIG. 2. The process begins with block 402 in which the network controller (e.g., device 102) receives a reservation request from device 'x' (e.g., device 104a) seeking to transmit to device 'y' (e.g., device 104b). In block 404, the network controller accesses per-pair link parameter table 302 and per-pair grant status table 304 to determine subband(s) F, timeslot(s) T, and link parameters, $LP_{x,y}$ which can be used for the transmission from device 'x' to device 'y' while keeping any interference (from the transmission from device 'x' to device 'y' onto other transmissions, and the interference from other transmissions onto the transmission from device 'x' to device 'y') at tolerable levels (e.g., where tolerable levels may be defined as keeping error rates below a determined threshold). In block 406, the network controller grants the reservation request. Accordingly, in block 408, the network controller 102 stores F and T to the table 304 and stores $LP_{x,y}$ to the table 302; and in block 410, the network controller instructs 'x' to carry out the transmission using link parameters $LP_{x,y}$ on subband(s) F during timeslot(s) T.

Figure 5:
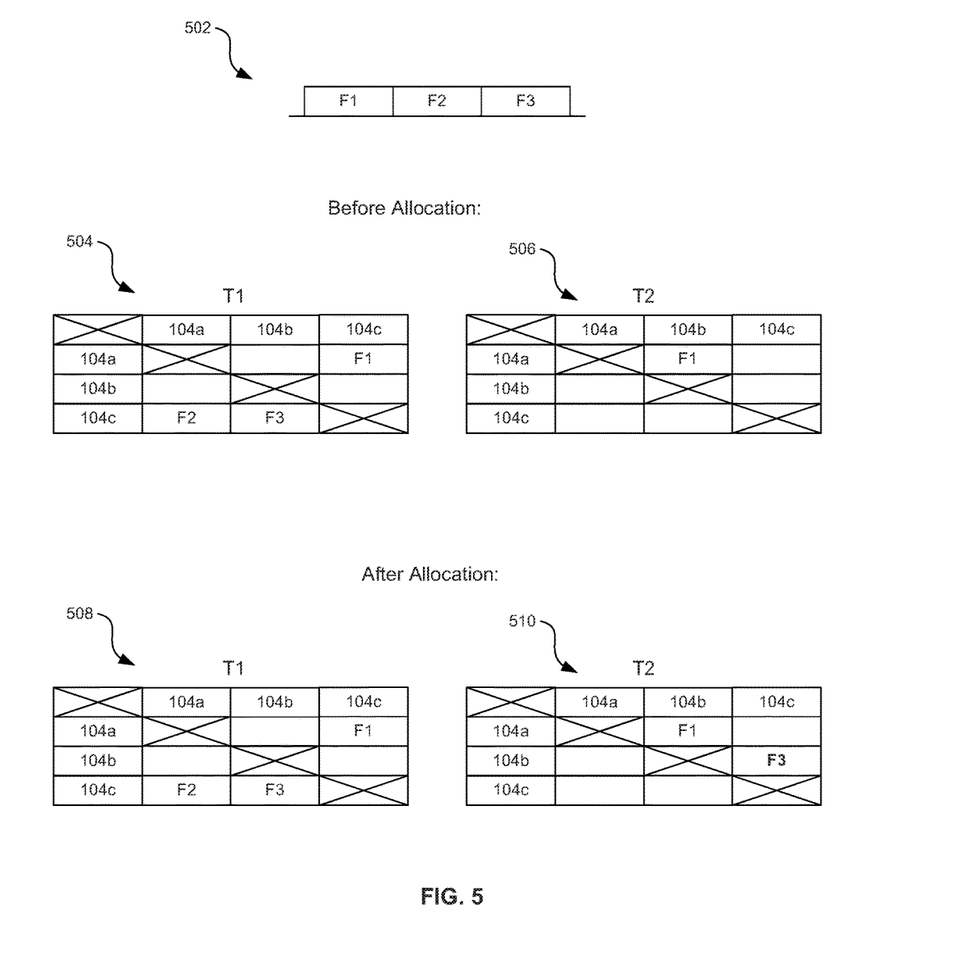
FIG. 5 illustrates an example allocation of timeslot and subband using per-pair link parameters and per-pair grant status data structures.

FIG. 5 illustrates an example allocation of timeslot and subband using per-pair link parameters and per-pair grant status data structures. In FIG. 5, device 104b has requested a reservation for a transmission to device 104c. Before the allocation, existing allocations are shown in tables 504 and 506 for timeslots T1 and T2, respectively. In this hypothetical example, the network controller 102 has three subbands, F1-F3, available for allocation. In determining whether to assign the requested communication from 104b to 104c to timeslot T1 or T2, the network controller 102 inspects the data structures to determine that all three subbands are already allocated for timeslot T1, thus the communication is assigned to timeslot T2. To decide which subband to allocate during timeslot T2, the network controller 102 takes into consideration that F1 has already been allocated for a communication from 104a to 104b. As a result of the physical topology of the network (104a and 104b are far apart) the per-pair link parameters for the communication from 104a and 104b inform the network controller that the device 104a will have to use high transmit power for that communication. As a result, some of that transmission may leak onto subband F2. Accordingly, the network controller decides to allocate F3 for the communication from 104b to 104c during timeslot T2, as shown in 510.

In accordance with an example implementation of this disclosure, circuitry (e.g., circuitry or chipset 204) for use in a network controller (e.g., device 102) comprises a processor (e.g., 206) and memory (e.g., 208). The network controller is operable to control communications in a network comprising a plurality of devices (e.g., 104a, 104b, and 104c) connected via a shared coaxial cable (e.g., 106a-106f). The circuitry is operable to maintain one or more data structures (e.g., read and write data structures 302 and 304 in memory 208) that hold per-sender-receiver-pair link parameters and per-sender-receiver-pair bandwidth grant status. The circuitry is operable to, in response to receipt of a reservation request (or a request to transmit) on the shared coaxial cable, decide which one or more of a plurality of subbands (e.g., which one or more of F1-F3 in the example of FIG. 5) and which one or more of a plurality timeslots (e.g., the timeslots T1 and T2 in the example of FIG. 5) to reserve for the transmission based, at least in part, on the per-sender-receiver-pair link parameters and the per-sender-receiver-pair bandwidth grant status in the one or more data structures. The circuitry is operable to generate a reservation grant message that indicates the decided one or more subbands and the decided one or more timeslots. The per-sender-receiver-pair link parameters comprise a minimum transmit power parameter for each sender-receiver pair of the plurality of devices (e.g., for the example of FIG. 5, each of the following sender-receiver pairs: (104a, 104b), (104b, 104a), (104b, 104c), (104c, 104b), (104a, 104c), and (104c, 104a). The per-sender-receiver-pair link parameters may, for example, comprise a minimum transmit power parameter for each sender-receiver pair of the plurality of devices. The processor and memory may, for example, be operable to determine the per-sender-receiver-pair link parameters based at least in part on probes communicated over the shared coaxial cable by the plurality of devices. The per-sender-receiver-pair grant status may, for example, indicate a reserved one or more subbands and a reserved one or more timeslots for each of a plurality of granted reservation requests. The circuitry may, for example, be operable to reserve a first subset of the plurality of subbands (e.g., F1 in the example of FIG. 5) during a particular timeslot (e.g., timeslot T2 in the example of FIG. 5) for a first granted reservation request, and reserve a second subset of the plurality of subbands (e.g., F3 in the example of FIG. 5) during the particular timeslot for a second granted reservation request such that communications of the first granted reservation request and of the second granted reservation request are to occur concurrently (or simultaneously) on the shared coaxial cable. The per-sender-receiver-pair link parameters may comprise link parameters used for previous communications on the shared coaxial cable. The per-sender-receiver-pair link parameters may comprise link parameters to be used for future communications on the shared coaxial cable. The circuitry may comprise a transceiver (e.g., 202) operable to measure a performance metric on the shared coaxial cable, and make the measured performance metric available to the processor. The processor may be operable to update the one or more data structures based, at least in part, on the measured performance metric.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," "for example," "exemplary," and the like, set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:
   circuitry comprising a processor and memory for use in a controller of a network comprising a plurality of devices connected via a shared coaxial cable, wherein:
      the circuitry is operable to maintain one or more data structures that hold, for each sender-receiver pair of the plurality of devices that are directly connected to each other via the shared coaxial cable, at least:
         one or more per-sender-receiver-pair link parameters other than device identity parameters, wherein the one or more per-sender-receiver-pair link parameters comprise:
            a respective list of spectral characteristics for a plurality of frequencies; and
            link parameters used for previous communications on the shared coaxial cable; and
         per-sender-receiver-pair bandwidth grant status;
      the circuitry is operable to, in response to receipt of a reservation request on the shared coaxial cable, decide which one or more of a plurality of subbands and which one or more of a plurality timeslots to reserve for a transmission based, at least in part, on the per-sender-receiver-pair link parameters and the per-sender-receiver-pair bandwidth grant status in the one or more data structures; and
      generate a reservation grant message that indicates the decided one or more subbands and the decided one or more timeslots.

2. The system of claim 1, wherein the one or more per-sender-receiver-pair link parameters comprise a minimum transmit power parameter.

3. The system of claim 1, wherein the processor and memory are operable to determine the one or more per-sender-receiver-pair link parameters based, at least in part, on probes communicated over the shared coaxial cable between said each sender-receiver pair of the plurality of devices that are directly connected to each other via the shared coaxial cable.

4. The system of claim 1, wherein the per-sender-receiver-pair bandwidth grant status comprises one of a plurality of status indicators comprising:
   a first status indicator that indicates no reservation requested is pending or granted;
   a second status indicator that indicates a reservation request is pending; and a third status indicator that indicates a reserved one or more subbands and a reserved one or more timeslots have been granted.

5. The system of claim 1, wherein the one or more per-sender-receiver-pair link parameters comprise link parameters, other than link scheduling information, to be used for future communications on the shared coaxial cable.

6. The system of claim 1, wherein the circuitry comprises a transceiver operable to:
measure a performance metric on the shared coaxial cable; and
make the measured performance metric available to the processor.

7. The system of claim 6, wherein the processor is operable to update the one or more data structures based, at least in part, on the measured performance metric.

8. A method comprising:
receiving, by circuitry in a network controller of a network comprising a plurality of devices connected via a shared coaxial cable, a reservation request on the shared coaxial cable;
maintaining, by the circuitry, one or more data structures stored in memory, wherein the one or more data structures hold, for each sender-receiver pair of the plurality of devices that are directly connected to each other via the shared coaxial cable, at least:
one or more per-sender-receiver-pair link parameters other than device identity parameters, wherein the one or more per-sender-receiver-pair link parameters comprise:
a respective list of spectral characteristics for a plurality of frequencies; and
link parameters used for previous communications on the shared coaxial cable; and
per-sender-receiver-pair bandwidth grant status;
deciding, by the circuitry, which one or more of a plurality of subbands and which one or more of a plurality timeslots to reserve for a transmission based, at least in part, on the per-sender-receiver-pair link parameters and the per-sender-receiver-pair bandwidth grant status in the one or more data structures; and
generating, by the circuitry, a reservation grant message that indicates the decided one or more subbands and the decided one or more timeslots.

9. The method of claim 8, wherein the one or more per-sender-receiver-pair link parameters comprise a minimum transmit power parameter.

10. The method of claim 8, comprising determining, by the circuitry, the one or more per-sender-receiver-pair link parameters based, at least in part, on probes communicated over the shared coaxial cable between said each sender-receiver pair of the plurality of devices that are directly connected to each other via the shared coaxial cable.

11. The method of claim 8, wherein the per-sender-receiver-pair bandwidth grant status comprises one of a plurality of status indicators comprising:
a first status indicator that indicates no reservation requested is pending or granted;
a second status indicator that indicates a reservation request is pending; and
a third status indicator that indicates a reserved one or more subbands and a reserved one or more timeslots have been granted.

12. The method of claim 8, wherein the one or more per-sender-receiver-pair link parameters comprise link parameters, other than link scheduling information, to be used for future communications on the shared coaxial cable.

13. The method of claim 8, comprising:
measuring by a transceiver of the circuitry, a performance metric on the shared coaxial cable; and
making the measured performance metric available to a processor of the circuitry.

14. The method of claim 13, comprising updating, by the processor, the one or more data structures based, at least in part, on the measured performance metric.

* * * * *